US010769322B2

(12) United States Patent
Hashimoto et al.

(10) Patent No.: US 10,769,322 B2
(45) Date of Patent: Sep. 8, 2020

(54) PROCEDURE EXTRACTION SYSTEM (71) Applicant: MITSUBISHI ELECTRIC CORPORATION, Tokyo (JP)

(72) Inventors: Masanori Hashimoto, Tokyo (JP); Yasuomi Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 484 days.

(21) Appl. No.: 15/551,771

(22) PCT Filed: Feb. 19, 2015

(86) PCT No.: PCT/JP2015/000785
§ 371 (c)(1),
(2) Date: Aug. 17, 2017

(87) PCT Pub. No.: WO2016/132396
PCT Pub. Date: Aug. 25, 2016

(65) Prior Publication Data
US 2018/0032652 A1  Feb. 1, 2018

(51) Int. Cl.
*G06F 30/20* (2020.01)
*G05B 23/02* (2006.01)
(Continued)

(52) U.S. Cl.
CPC .............. *G06F 30/20* (2020.01); *F24F 11/30* (2018.01); *G05B 23/0235* (2013.01);
(Continued)

(58) Field of Classification Search
CPC . G06F 30/20; G06F 2111/10; G05B 23/0275; G05B 23/0235; F24F 11/30; F24F 11/52; F24F 11/64; F24F 11/32
See application file for complete search history.

(56) References Cited

U.S. PATENT DOCUMENTS

| 7,349,746 B2 * | 3/2008 | Emigholz ............ C10G 11/187 700/21 |
| 8,594,977 B2 * | 11/2013 | Laberge ............ G05B 23/0278 340/507 |
| 2014/0279795 A1 | 9/2014 | Shibuya et al. |

FOREIGN PATENT DOCUMENTS

| JP | 1-256000 A | 10/1989 |
| JP | 2007-293489 A | 11/2007 |

(Continued)

*Primary Examiner* — Rehana Perveen
*Assistant Examiner* — Steven W Crabb
(74) *Attorney, Agent, or Firm* — Birch, Stewart, Kolasch & Birch, LLP (57) ABSTRACT

A procedure extraction system will be provided which can extract a procedure related to determining the cause of abnormality in facility equipment from analysis procedures in accordance with which the operator analyzes the operating conditions of the facility equipment. The procedure extraction system includes an analysis log storage to store a procedure in accordance with which an operator has analyzed an operating condition of facility equipment using operation data relating to the operating condition of the facility equipment, a graph creation unit to create a graph using the operation data, a region specification unit to specify at least a region of the graph, and an output step extraction unit to extract, from among steps included in the procedure stored in the analysis log storage, a step necessary for creating the graph including the region specified by the region specification unit.

2 Claims, 10 Drawing Sheets

(51) Int. Cl.
  *F24F 11/30*  (2018.01)
  *G06F 111/10*  (2020.01)
  *F24F 11/32*  (2018.01)
  *F24F 11/64*  (2018.01)
  *F24F 11/52*  (2018.01)

(52) U.S. Cl.
  CPC .......... *G05B 23/0275* (2013.01); *F24F 11/32* (2018.01); *F24F 11/52* (2018.01); *F24F 11/64* (2018.01); *G06F 2111/10* (2020.01)

(56) References Cited

FOREIGN PATENT DOCUMENTS

| JP | 2013-041448 A | 2/2013 |
| WO | WO 2013/030984 A1 | 3/2013 |

\* cited by examiner

| Time | Operation content |
|---|---|
| 15:59 | Displaying graph of operation data A |
| 16:00 | Displaying graph of operation data B |
| 16:01 | Displaying graph of operation data C |
| 16:02 | Generating composite data K from operation data B and operation data C. Arithmetic expression (B-C) |
| 16:03 | Displaying graph of composite data K |
| 16:03 | Comparing composite data K with threshold $m$ |
| 16:04 | Determining that region where composite data K is larger than threshold $m$ is cause of abnormality |

| Time | Operation content |
|---|---|
| 15:59 | Displaying graph of operation data D |
| 16:00 | Displaying graph of operation data E |
| 16:01 | Generating composite data L from operation data D and operation data E. Arithmetic expression (D-E) |
| 16:02 | Displaying graph of composite data L |
| 16:03 | Displaying graph of operation data F |
| 16:03 | Displaying graph of operation data G |
| 16:04 | Generating composite data M from operation data F and operation data G. Arithmetic expression (F-G) |
| 16:04 | Displaying graph of composite data M |
| 16:05 | Generating composite data N from composite data L and composite data M. Arithmetic expression (L-M) |
| 16:06 | Displaying graph of composite data N |
| 16:07 | Comparing composite data N with threshold $n$ |
| 16:08 | Determining that region where composite data N is larger than threshold $n$ is cause of abnormality |

Fig. 10

| Operation content |
|---|
| Generating composite data L from operation data D and operation data E. Arithmetic expression (D-E) |
| Generating composite data M from operation data F and operation data G. Arithmetic expression (F-G) |
| Generating composite data N from composite data L and composite data M. Arithmetic expression (L-M) |
| Determining that region where composite data N is larger than threshold *n* is cause of abnormality |

PROCEDURE EXTRACTION SYSTEM

TECHNICAL FIELDS

The present invention relates to a procedure extraction system to extract at least a part of a procedure in accordance with which an operator analyzes operating conditions of the facility equipment, during the course of abnormality diagnosis or the like of facility equipment such as air-conditioning equipment.

BACKGROUND ART

As for facility equipment such as air-conditioning equipment, data relating to operating conditions of the facility equipment (hereinafter, referred to as "operation data") is collected using various sensors, and the collected operation data is stored in a storage device of an administration system and the like. When an abnormality such as a machine failure occurs in the facility equipment, an operator such as an engineer analyzes the operating conditions of the facility equipment with reference to the operation data stored in the storage device, to determine the cause of abnormality.

There is a traditional technique in which past abnormal incidents and the countermeasures thereto taken by engineers are saved in a database and utilized thereafter in the abnormality diagnosis of the facility equipment. In this technique, the diagnostic procedures which engineers took in the past abnormal incidents, namely, the procedures in accordance with which the engineers analyzed the operating conditions of the facility equipment are saved. (For example, refer to Patent Document 1)

PRIOR ART DOCUMENT

Patent Document 1

Patent Document 1: Japanese Patent Laid-Open Publication No. 2013-41448 (FIG. 17, etc.)

SUMMARY OF THE INVENTION

Problem to be Solved by the Invention

An engineer's analysis of the operating conditions of facility equipment, may sometimes require a number of steps before determining the cause of abnormality occurrence in the facility equipment. In this case, the analysis procedure taken by the engineers includes steps relevant to determination of the cause of the abnormality and steps resultantly irrelevant thereto. Therefore, in the traditional technique described above, if all the steps in a procedure taken by the engineer are to be saved in a database, steps irrelevant to determining the cause of abnormality are also saved. This sometimes leads to a problem in that, when the information saved in the database is referred to, the same useless steps as those in the past are taken despite referencing to a past incident. Although it is possible for the engineer to manually extract only the steps relevant to determination of the cause of abnormality to save in the database, it takes much workload for the engineer.

The present invention is made to solve the problem described above and aims to provide a procedure extraction system which can extract, from an analysis procedure taken by an operator (engineer), a portion of the procedure (steps) relevant to determining the cause of abnormality.

Means for Solving the Problem

A procedure extraction system which relates to the present invention includes an analysis log storage to store a procedure in accordance with which an operator has analyzed an operating condition of facility equipment using operation data relating to the operating condition of the facility equipment, a graph creation unit to create a graph using the operation data, a region specification unit to specify at least a region of the graph, and an output step extraction unit to extract, from among steps included in the procedure stored in the analysis log storage, a step necessary for creating the graph including the region specified by the region specification unit.

Effects of the Invention

According to the procedure extraction system disclosed in the present invention, because the output step extraction unit is provided to extract steps required to create a graph which includes a region specified by the region specification unit out of the steps included in the procedure stored in the analysis log storage, the steps relevant to determining the cause of abnormality of the facility equipment can be extracted out of the analysis procedure which the operator has performed. This reduces operator's workload.

MODES FOR CARRYING OUT THE INVENTION

Embodiment 1

Figure 1:
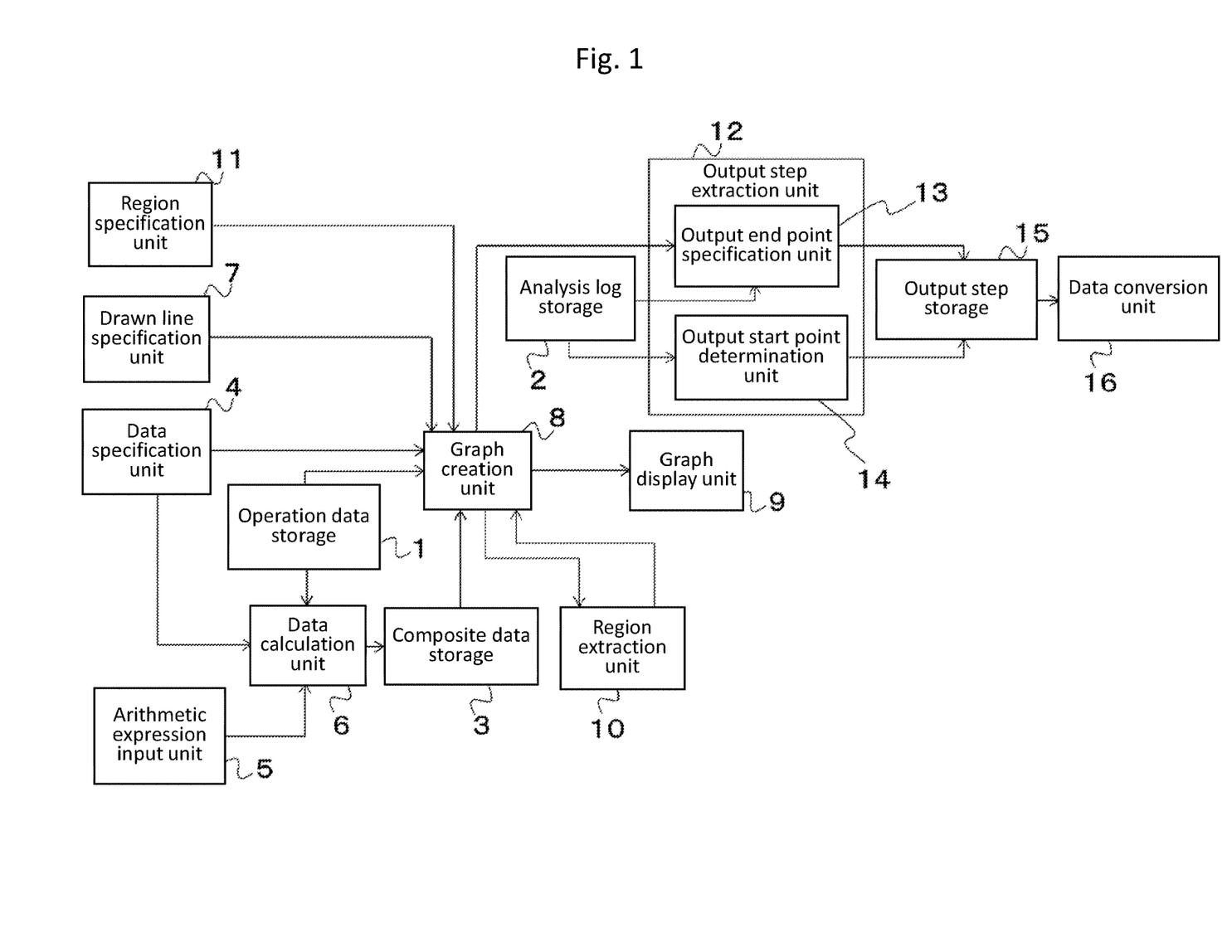
FIG. 1 shows a functional block diagram of a procedure extraction system according to Embodiment 1 of the present invention.

First, the function of a procedure extraction system according to Embodiment 1 of the present invention will be explained. FIG. 1 shows a functional block diagram of the procedure extraction system according to Embodiment 1 of the present invention.

An operation data storage 1 stores data (operation data) relating to operating conditions of the facility equipment collected by various sensors provided to the facility equipment. The operation data (also referred to as "primitive data") collected by the sensors is sent to and stored in the operation data storage 1 via wired or wireless communication.

The facility equipment may include, for example, air-conditioning equipment, power generation equipment, heat supply equipment, communication equipment, machine equipment and the like, but here, as an example, the air-conditioning equipment will be explained. The air-conditioning equipment is an air-conditioning system which includes an outdoor unit, an indoor unit, a controller and other units.

The present invention may be applied, for example, to maintenance checking, abnormality diagnosis, operation checking, and other operations of the facility equipment. Here, an application to abnormality diagnosis will be explained for an example.

In the air-conditioning equipment, the operation data collected by sensors includes, for example, refrigerant temperature, refrigerant pressure, power consumption of air-conditioning equipment, outside air temperature, indoor temperature, electric current flowing through electric parts, voltage applied to electric parts and the like.

An analysis log storage 2 stores a procedure in accordance with which an operator analyzes the operating conditions of the air-conditioning equipment using the operation data. Specifically, every time when the operator performs any step of an analysis procedure in an abnormality diagnosis, a specific operation content in the step and the time information on when the step is performed are related and stored together in the analysis log storage 2.

A composite data storage 3 stores composite data generated. Composite data, here, means data generated by using two or more pieces of operation data, to be more specific, by calculating the operation data. Note here that data generated by calculation using operation data and composite data, as well as data generated by calculation using two or more pieces of composite data are composite data because they can be said to be generated by calculating (by using) two or more pieces of operation data in the end.

Receiving an input from the operator, a data specification unit 4 specifies data to be used for creating a graph or generating composite data.

Receiving an input from the operator, an arithmetic expression specification unit 5 specifies an arithmetic expression to be used for generating composite data.

A data calculation unit 6 reads out data from the operation data storage 1 or the composite data storage 3, and generates composite data by using the arithmetic expression specified by the arithmetic expression specification unit 5. The composite data generated by the data calculation unit 6 is sent to the composite data storage 3.

Receiving an input from the operator, a drawn line specification unit 7 specifies the mathematical formula of a line indicating a threshold to be drawn on the graph. Here as for the threshold, for example, when the operator has knowledge that "data X larger than m is likely to be a cause of abnormality", "m" is a threshold. For example, if the threshold m is a numerical value, the mathematical formula to be specified is "y=m", where the vertical axis of the graph is "y". Not limited to a line parallel to the horizontal axis of the graph like "y=m", the line to be specified for indicating the threshold m may be an inclined line or a curved line.

On the basis of the information of data specified by the data specification unit 4, a graph creation unit 8 reads out data from the operation data storage 1 or the composite data storage 3 to create a graph and display the graph on the display unit 9. The graph creation unit 8 receives, from other functional blocks, information to be displayed on a graph display unit 9 such as the line indicating the threshold specified by the drawn line specification unit 7, and makes the graph display unit 9 display the information.

The graph display unit 9 displays the information received from the graph creation unit 8.

A region extraction unit 10 extracts a region where the line forming the graph created by the graph creation unit 8 is above the line drawn in the diagram indicating the threshold and a region where the graph-forming line is below the threshold-indicating line. In other words, the region extraction unit 10 extracts a region where the graph data is larger than the threshold and a region where smaller than the threshold.

Receiving an input from the operator, a region specification unit 11 specifies a region considered to be the cause of abnormality of the air-conditioning equipment from the regions extracted by the region extraction unit 10.

An output step extraction unit 12 includes an output end point specification unit 13 and an output start point determination unit 14. The output step extraction unit 12 extracts steps to be outputted from among the steps included in the analysis procedures stored in the analysis log storage 2.

The output end point specification unit 13 of the output step extraction unit 12 specifies the last step in time order in the steps to be outputted, as an output end point, from among the steps stored in the analysis log storage 2. Specifically, the step in which the region is specified by the region specification unit 11 is to be specified as the output end point.

The steps to be outputted here means steps relating to the graph including the region specified by the region specification unit 11. To be more specific, those are the steps necessary for creating the graph including the region specified by the specification unit 11.

The output start point determination unit 14 of the output step extraction unit 12 specifies the first step in time order in the steps to be outputted, as the output start point, from among the steps stored in the analysis log storage 2. Specifically, the output start point determination unit 14 traces back, in reverse time order, the steps stored in the analysis log storage 2 starting from the output end point to determine whether or not each step stored in the analysis log storage 2 is a step necessary for creating the graph including the region specified by the region specification unit 11. Then, the output start point determination unit 14 extracts steps necessary for creating the graph including the region specified by the specification unit 11 to send the steps to an output step storage 15. Then, the output start point determination unit 14 specifies the first step in time order from among the extracted steps, as the output start point.

The output step storage 15 stores the step extracted by the output start point determination unit 14.

A data conversion unit 16 reads out data from the output step storage 15 to convert into text-format data and output it. The output form may be electronic data including text data, and also may be print-outs of the text or the text displayed on the screen. When outputted from the data conversion unit 16, the electronic data may be outputted to an external device of the procedure extraction system or to an external storage medium thereof, or may be outputted to a storage device provided in the procedure extraction system.

Figure 2:
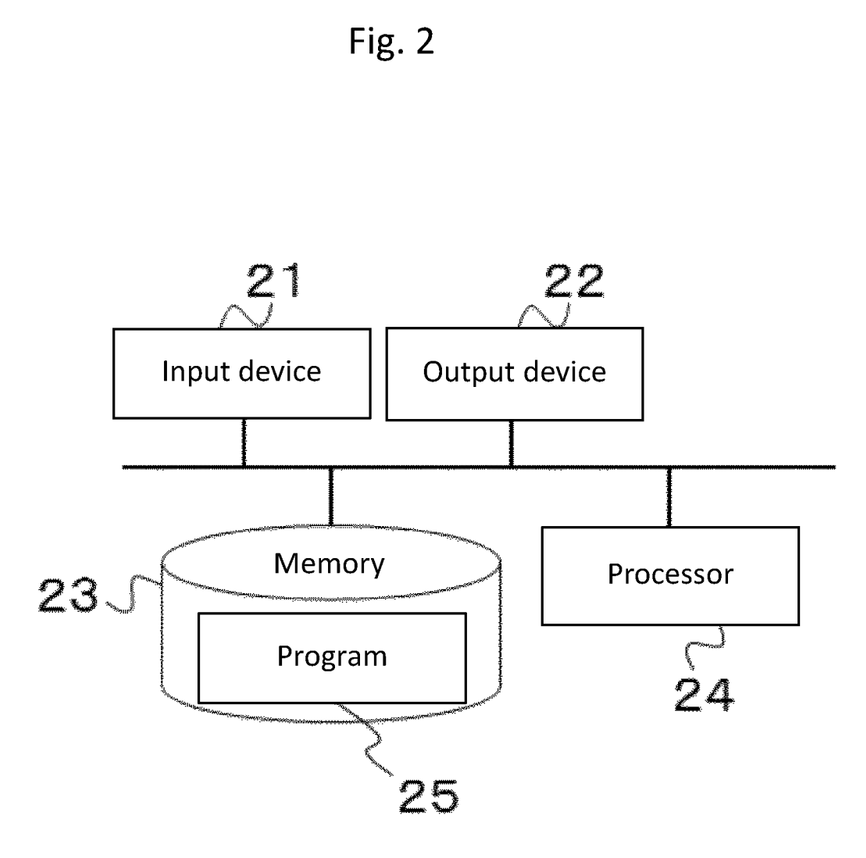
FIG. 2 shows a hardware configuration diagram of the procedure extraction system according to Embodiment 1 of the present invention.

Next, a hardware configuration of the procedure extraction system according to Embodiment 1 of the present invention will be explained. FIG. 2 shows a hardware configuration diagram of the procedure extraction system according to Embodiment 1 of the present invention.

An input device 21 is used by an operator to input various kinds of information to the procedure extraction system. An input interface device such as a keyboard, a mouse, a touch panel is the input device 21, and multiple input devices 21 may be provided.

An output device 22 is a device for outputting from the procedure extraction system to the outside of the system. A device such as a display, a printer, or a connector for linkage with external devices is the output device 22. A display with a touch panel may function both as an input device 21 and an output device 22. Multiple output devices 22 may be provided to the system.

A memory 23 stores the operation data, the composite data, as well as data of the procedure in accordance with which an operator analyzed the operating conditions of the air-conditioning equipment using the operation data. The memory 23 also stores a program 25 to be executed by a processor 24.

The processor 24 reads out and executes the program 25 stored in the memory 23. The procedure extraction system operates to perform each function by the execution of the program 25.

Next, it will be explained about which hardware shown in the hardware configuration diagram of the FIG. 2 realizes individual functions shown in the functional block diagram of FIG. 1.

The output function for outputting from the data conversion unit 16 to the outside of the procedure extraction system and the function of the graph display unit 9 are realized by the output device 22. The functions of the operation data storage 1, the analysis log storage 2, and the composite data storage 3, and the output step storage 15 are realized by the memory 23. The program 25 is executed by the processor 24, to realize the functions of the data specification unit 4, the arithmetic expression specification unit 5, the drawn line specification unit 7, the region specification unit 11, the data calculation unit 6, the graph creation unit 8, the region extraction unit 10, the output end point specification unit 13, and the output start point determination unit 14, as well as the data conversion function of the data conversion unit 16. The data specification unit 4, the arithmetic expression specification unit 5, the drawn line specification unit 7, and the region specification unit 11 receive inputs from the input device 21, each of which sends the inputted information to another functional block upon receiving the inputs from the input device 21.

Figure 3:
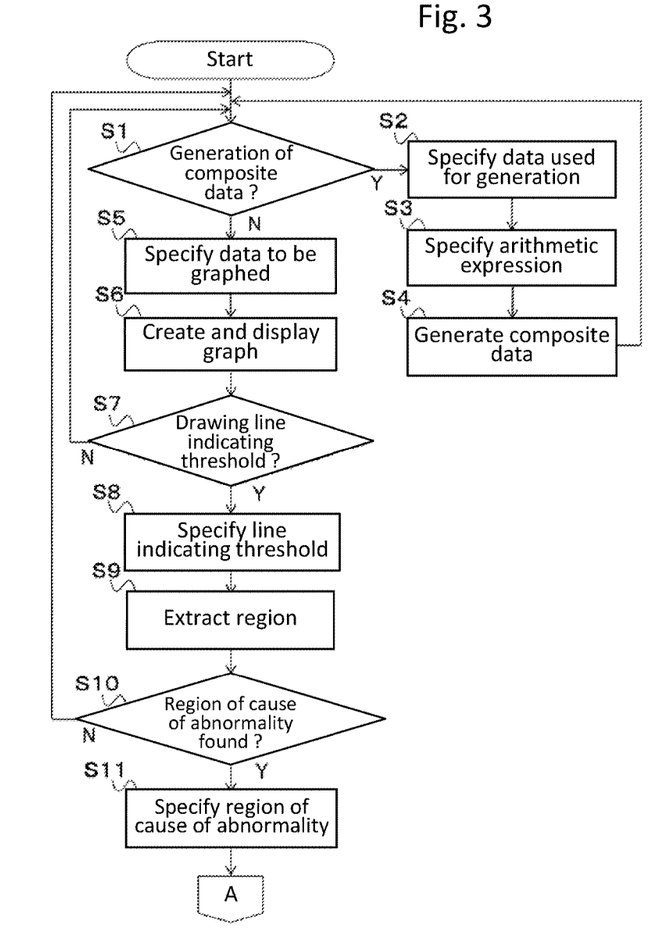
FIG. 3 shows one part of a flowchart of a procedure extraction method including the operation of the procedure extraction system according to Embodiment 1 of the present invention.
Figure 4:
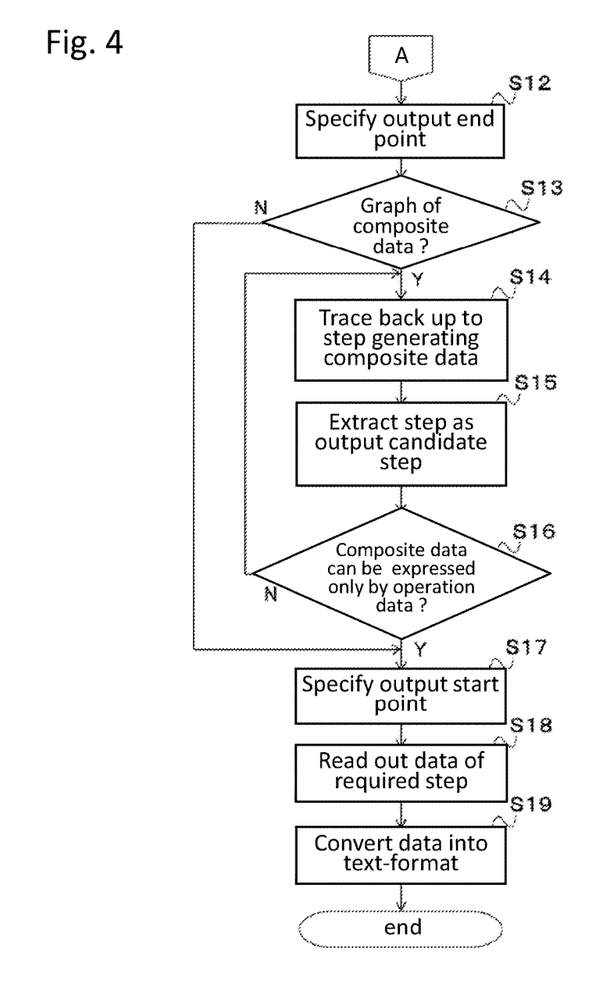
FIG. 4 shows the other part of the flowchart of the procedure extraction method including the operation of the procedure extraction system according to Embodiment 1 of the present invention.

Next, the operation of the procedure extraction system according to Embodiment 1 of the present invention will be explained. FIG. 3 and FIG. 4 are flowcharts which show a procedure extraction method including the operation of the procedure extraction system according to Embodiment 1 of the present invention. Note that the flowchart of FIG. 3 and the flowchart of FIG. 4 are linked with each other at the part of "A" in FIG. 3 and the part of "A" in FIG. 4.

When an abnormality such as a machine failure occurs in air-conditioning equipment, an operator such as an engineer starts analyzing the operating conditions of the air-conditioning equipment in order to determine the cause of the abnormality occurrence in the air-conditioning equipment. Here, the operator uses sensor-collected operation data to analyze operating conditions of the air-conditioning equipment.

In S1, considering which data should be referenced on the basis of the abnormal phenomena occurrence in the air-conditioning equipment, the operator determines whether to generate composite data. When generating composite data, the process proceeds to S2. When not generating composite data, the process proceeds to S5.

In S2, the operator specifies at least two data sets to be used for generating composite data, to the data specification unit 4. When the data sets are specified, there are cases where only operation data sets are included, where only composite data sets are included, and where both operation data set and composite data set are included. Receiving an input from the operator, the data specification unit 4 specifies data sets to be used for the data calculation unit 6 to generate composite data.

In S3, the operator inputs an arithmetic expression to be used for generating composite data into the arithmetic expression specification unit 5. Receiving the input from the operator, the arithmetic expression specification unit 5 specifies an arithmetic expression to be used for generating composite data for the data calculation unit 6.

In S4, the data calculation unit 6 reads out the specified data according to the information on the data specified by the data specification unit 4; that is, the data calculation unit reads out the specified operation data from the operation data storage 1 when operation data is specified, and reads out the specified composite data from the composite data storage 3 when composite data is specified. Then, the data calculation unit 6 generates composite data using the read-out data and the arithmetic expression specified by the arithmetic expression specification unit 5. The generated composite data is sent to and stored in the composite data storage 3.

Here, the fact that the step (S4) for generating composite data has been performed is stored in the analysis log storage 2. Specifically, details of calculation and data used in the step for obtaining the composite data are related with the time information on when the step is performed and stored together.

After S4 is completed, the process returns to S1.

In S1, when the operator determines not to generate composite data, the process proceeds to S5.

In S5, the operator specifies at least a single data set to be graphed, to the data specification unit 4. As for the data specified, there are a case which includes only operation data, a case which includes only composite data, and a case which includes both operation data and composite data. Receiving an input from the operator, the data specification unit 4 specifies the data to be graphed, to the graph creation unit 8.

In S6, on the basis of the information on the data specified by the data specification unit 4, the graph creation unit 8 reads out the specified operation data from the operation data storage 1 when operation data is specified, and reads out the specified composite data from the composite data storage 3 when composite data is specified. Then, the graph creation unit 8 creates a graph of the read-out data to display on the graph display unit 9. When multiple data sets are specified by the data specification unit 4, the graph creation unit 8 creates a graph for each data set to display multiple graphs on the graph display unit 9 in a superimposed manner.

Here, the fact that the step (S6) for creating graphs has been performed is stored in the analysis log storage 2. Specifically, details of used data and a graph created there-from to be displayed are related with the time information on when the step is performed and stored together.

In S7, the operator determines whether to draw a line indicating a threshold on the graph created in S6. The process proceeds to S8 when the line indicating the threshold is to be drawn, and returns to S1 when not to be drawn.

In S8, the operator inputs information on the line indicating the threshold to be drawn on the graph into the drawn line specification unit 7. Specifically, the threshold value may be inputted, but not limited to a value, a mathematical formula of a straight line or a curved line may be inputted. Receiving an input from the operator, the drawn line specification unit 7 specifies a line to be drawn on the graph for the graph creation unit 8. The graph creation unit 8 draws the line specified by the drawn line specification unit 7 on the graph to display on the graph display unit 9.

Here, the fact that the step (S8) for drawing the line indicating the threshold on the graph has been performed is stored in the analysis log storage 2. Specifically, details of the threshold, the line indicating the threshold, and the graph including the line are related with the time information on when the step is performed and stored together.

In S9, the region extraction unit 10 extracts a region where the line forming the graph is above the line drawn in the diagram indicating the threshold and a region where the graph-forming line is below the threshold-indicating line. In other words, the region extraction unit 10 extracts a region where the graph data is larger than the threshold and a region where smaller than the threshold. Then, the region extraction unit 10 sends the positional information of the extracted regions in the graph to the graph creation unit 8. On the basis of the positional information received from the region extraction unit 10, the graph creation unit 8 commands the graph display unit 9 to display, for example, an icon as an operation button (hereinafter, referred to as "operation icon") corresponding to each of the extracted regions.

The operator can select (specify) each region by clicking, or touching on the touch panel. When the operation icon is operated by the operator, the operation content is sent to the region specification unit 11.

In S10, the operator determines whether each region extracted by the region extraction unit 10 relates to the cause of abnormality occurrence in the air-conditioning equipment. For example, if the operator has knowledge that "data X larger than m is likely to be a cause of abnormality", the operator determines that a region where the data X is larger than m, namely, a region where the line forming the graph of the data X is above the line indicating the threshold m, is the cause of abnormality of the air-conditioning equipment. If, in the graph, a region is found which is considered to be the cause of abnormality of the air-conditioning equipment, the process proceeds to S11, and if not found, the process returns to S1.

In S11, the operator operates an operation icon displayed in the region considered to be the cause of abnormality of the air-conditioning equipment. In response to the operation, the region specification unit 11 specifies the region as the cause of abnormality of the air-conditioning equipment. Here, a single or multiple regions may be specified. As explained above, receiving an input from the operator, the region specification unit 11 specifies the region considered to be the cause of abnormality of the air-conditioning equipment for the graph creation unit 8. The graph creation unit 8 sends a command to the graph display unit 9 to show that the region is specified.

Here, the fact that the step (S11) for specifying a region considered to be the cause of abnormality of the air-conditioning equipment has been performed is stored in the analysis log storage 2. Specifically, details of data, a graph thereof, and a portion of the graph considered to be the cause of abnormality are related with the time information on when the step has been performed and stored together.

Hereinafter, the region specified in S11 is referred to as "region P" and the graph which includes the region P is referred to as "graph Q".

After the fact that S11 has been performed is stored in the analysis log storage 2, in S12 the graph creation unit 8 sends, to the output step extraction unit 12, the information that a region P has been specified by the region specification unit 11. When receiving the information that a region P is specified, the output end point specification unit 13 of the output step extraction unit 12 specifies, from among the steps stored in the analysis log storage 2, the step (S11) in which the region P has been specified by the region specification unit 11 as an output end point. Further, the output end point specification unit 13 extracts, from among the steps stored in the analysis log storage 2, the step set as the output end point, and stores the extracted step in the output step storage 15 as an output candidate step.

In S13, the output start point determination unit 14 of the output step extraction unit 12 determines whether the graph Q including the region P specified by the region specification unit 11 is a graph of composite data or a graph of operation data. If the graph Q is a graph of composite data, the process proceeds to S14, and if the graph is a graph of operation data, the process proceeds to S17.

Hereinafter, if the graph Q is a graph of composite data, the composite data is referred to as "composite data Z".

In S14, the output start point determination unit 14 traces back, in reverse time order, the steps stored in the analysis log storage 2 from the output end point. Upon reaching any one of the steps necessary for creating the graph Q, the tracing-back operation is stopped. Because the graph Q is a graph of composite data, the step necessary for creating the graph Q is, in other words, the step necessary for generating the composite data Z. Or putting it in another way, the step necessary for generating the composite data Z is the step including the information on the arithmetic expression used for generating the composite data Z.

Here, for example, a case is assumed; where composite data Z is expressed as $Z=X-Y$ using composite data X and Y; the composite data X is expressed as $X=A-B$ using operation data A and B; and the composite data Y is expressed as $Y=C-D$ using operation data C and D. Under this assumption, "the steps necessary for generating the composite data Z" is the step (S4) to generate composite data, and includes the step to perform "X−Y" calculation in which the composite data Z is generated, the step to perform "C−D" calculation in which the composite data Y is generated, and the step to perform "A−B" calculation in which the composite data X is generated. In S14, upon reaching any one of these steps, the tracing-back operation is stopped. For example, if the operator performs respective steps to generate composite data X, Y, and Z in the order of the composite data X, the composite data Y, and the composite data Z, when the steps stored in the analysis log storage 2 are traced back, in reverse time order, from the output end point, the step in which the composite data Z is generated will be reached first.

In S15, the output start point determination unit 14 extracts the step reached in S14, from among the steps stored in the analysis log storage 2, and stores the extracted step in the output step storage 15 as an output candidate step.

In S16, the output start point determination unit 14 acquires the information of the arithmetic expression included in the step stored in the output step storage 15, and determines whether the composite data Z can be expressed by operation only between operation data on the basis of the information of the arithmetic expression. At this point, if the composite data Z can be expressed only by the operation data, the process proceeds to S17, and if not, the process returns to S14. Thereafter, the steps from S14 to S16 are repeated until a determination that it is "possible" is obtained in S16. In this manner, the output start point determination unit 14 traces back the steps stored in the analysis log storage 2 to acquire information of the arithmetic expressions used in the output candidate steps. The operation, as described above, to trace back the steps stored in the analysis log storage 2 to acquire information on the arithmetic expressions, continues until the composite data Z can come to be expressed by operation only between operation data.

Here, an explanation will be made using the above example. When performing S16 for the first time, the step extracted by the output start point determination unit 14 into the output step storage 15 is only the step in which the composite data Z is generated by performing "X–Y" calculation. Both X and Y are the composite data. X and Y, however, cannot be expressed by operation data at this point even if the steps extracted so far in the output step storage 15 are referenced. Therefore, the process returns to S14, to restart tracing-back the steps stored in the analysis log storage 2. It is when the tracing-back operation reaches a step in which the composite data Y has been generated by performing "C–D" calculation that the tracing-back operation next reaches "a step necessary for generating the composite data Z". Here, the process proceeds to S15, to also extract the step into the output step storage 15, and then the process proceeds to S16. At this point, with reference to the steps stored in the output step storage 15, it is becomes clear that the composite data Z can be expressed as "Z=X–Y=X–(C–D)". However, it is still impossible to express the composite data Z only by the operation data. Therefore, the process returns to S14. After restarting tracing back the steps stored in the analysis log storage 2, it is when the tracing-back operation reaches the step in which the composite data X has been generated by performing "A–B" calculation that the tracing-back operation next reaches "a step necessary for generating the composite data Z". Here, the process proceeds to S15, to also extract the step, and then the process proceeds to S16. At this point, with reference to the steps extracted and stored in the output step storage 15, it becomes clear that the composite data Z can be expressed as "Z=X–Y=(A–B)–(C–D)". This means that the composite data Z can be expressed only by the operation data. Therefore, the process proceeds to S17.

S17 is the step to specify an output start point from among the steps stored in the analysis log storage 2.

First, a case will be explained where the process proceeds, through S13, S14, S15, S16, to S17, namely, where the graph Q is a graph of composite data. In S16, when it is determined, by the output start point determination unit 14, that the composite data Z can be expressed by operation only between operation data, the output start point determination unit 14 specifies, as the output start point, the step necessary for creating the graph Q, namely the first step (the step with the earliest implementation time) from among the steps including the information on the arithmetic expression used to generate the composite data Z, and then stops further tracing back the steps stored in the analysis log storage 2. In other words, the output start point determination unit 14 specifies, as the output start point, the last stored step from among the steps stored at this point in the output step storage 15.

Next, explanation will be made about a case where the process proceeds from S13 directly to S17, namely a case where the graph Q is a graph of operation data. The output start point determination unit 14 specifies, as the output start point, the step specified as the output end point in S12, namely the step in which the region P is specified by the region specification unit 11. That is, the output end point coincides with the output start point.

Then, the process proceeds to S18. From this step on, the process is common between the case where the process proceeds from S13 to S17 via S14, S15 and S16, and the case where the process proceeds from S13 directly to S17. In S18, the data conversion unit 16 reads out the data of the steps stored in the output step storage 15.

In S19, the data conversion unit 16 converts the data read out from the output step storage 15 into text-format data, to output them.

Next, a concrete example of the operation of the procedure extraction system according to Embodiment 1 of the present invention will be explained.

Figure 5:
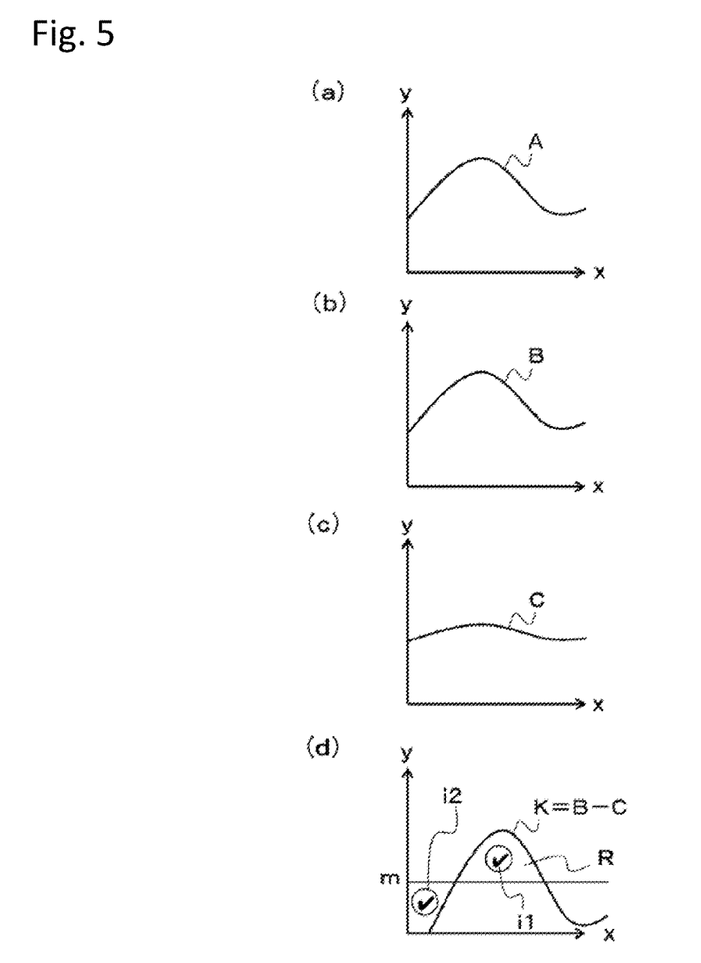
FIG. 5 are drawings which show an analysis procedure taken by an operator in an operation example 1 of the procedure extraction system according to Embodiment 1 of the present invention.
Figure 6:
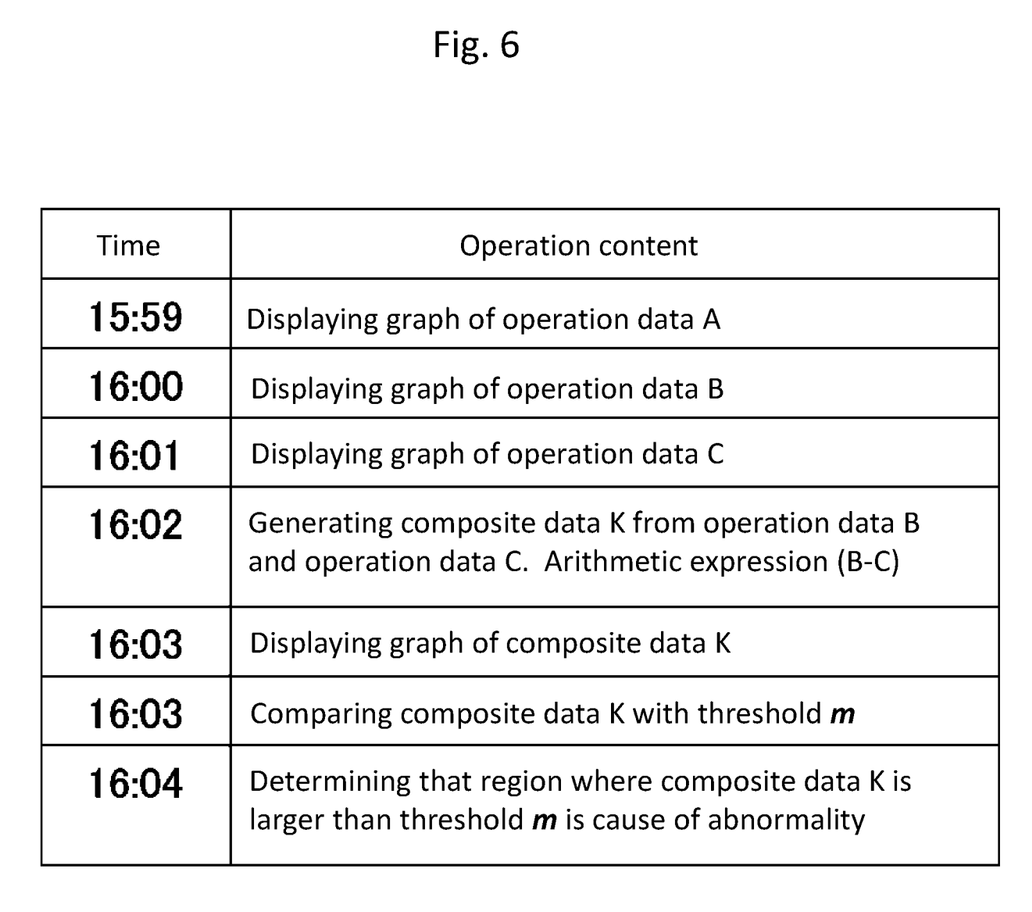
FIG. 6 shows an example of the analysis procedure taken by the operator and stored in an analysis log storage in the operation example 1.
Figure 7:
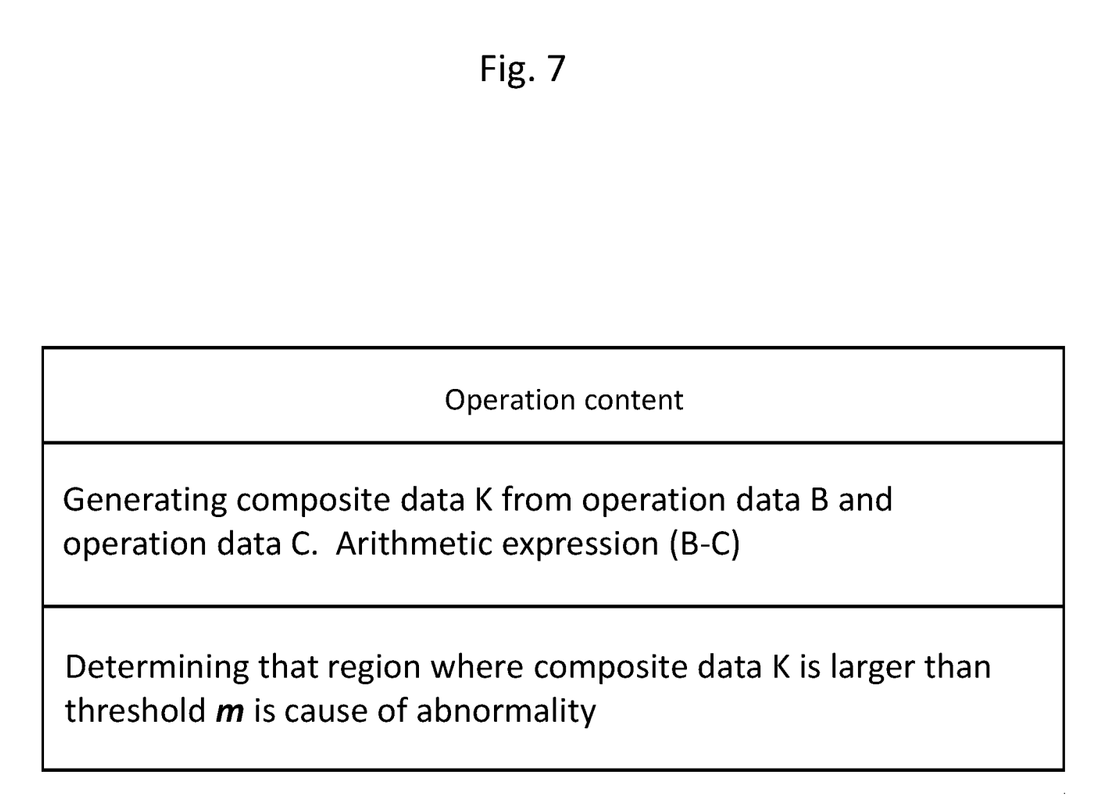
FIG. 7 shows an example of texts outputted from a data conversion unit in the operation example 1.

First, an operation example 1 will be explained. FIG. 5 shows an analysis procedure which has been performed by an operator in the operation example 1 of the procedure extraction system according to Embodiment 1 of the present invention. Note here that, FIGS. 5 (a) through (d) are arranged in time order. FIG. 6 is an example of the analysis procedure which has been performed by the operator in the operation example 1 and stored in the analysis log storage 2. FIG. 7 is an example of a text outputted from the data conversion unit 16 in the operation example 1.

First, in S1, the operator determines not to generate composite data, and the process thereby proceeds to S5. In S5, the operator specifies the operation data A as data to be graphed, to the data specification unit 4. Receiving the input from the operator, the data specification unit 4 specifies the operation data A to the graph creation unit 8. In S6, the graph creation unit 8 reads out the operation data A from the operation data storage 1, creates a graph, and makes the graph display unit 9 display the graph. Thus, the graph of FIG. 5(a) is displayed. Here, as shown in FIG. 6, the fact that the step (S6) for creating the graph of the operation data A has been performed, is stored in the analysis log storage 2.

Next, in S7, the operator determines not to draw a line indicating the threshold on the graph of the operation data A created in S6, and the process returns to S1. Similarly, after that, the process returning to S1 via S1, S5, S6 and S7 is repeated, and the graphs of the operation data B and the operation data C are created to be displayed by the graph display unit 9. By these operations, the graphs of FIG. 5(b) and FIG. 5(c) are sequentially displayed. As shown in FIG. 6, the fact that the step for creating the graph of the operation data B has been performed and the fact that the step for creating the graph of the operation data C has been performed are individually stored in the analysis log storage 2.

Next, when the process returns from S7 after creating and displaying the graph of the operation data C in S6, in S1 the operator determines to generate composite data, so that the process proceeds to S2. In S2, the operator specifies, to the data specification unit 4, the operation data B and the operation data C as the data to be used for generating composite data. In S3, the operator specifies that an arithmetic expression of subtracting the operation data C from the operation data B is used for generation of the composite data. In S4, the data calculation unit 6 reads out the operation data B and the operation data C from the operation data storage 1, and performs calculation to generate the composite data K using the arithmetic expression specified by the arithmetic expression specification unit 5. The composite data K is sent to the composite data storage 3 and stored. Here, as shown in FIG. 6, the fact that the step (S4) for generating the composite data K has been performed, is stored in the analysis log storage 2, and the process proceeds to S1 after S4.

Next, through S1, S5 and S6, the graph of the composite data K is created and displayed on the graph display unit 9. In this manner, the graph of the composite data K is displayed as shown in FIG. 5(*d*). Here, as shown in FIG. 6, the fact that the step (S6) for creating the graph of the composite data K has been performed, is stored in the analysis log storage 2.

Next, in S7, the operator determines to draw a line indicating the threshold on the graph of the composite data K created in S6, and the process proceeds to S8. In S8, the operator inputs the value of the threshold m into the drawn line specification unit 7. Then, receiving the input from the operator, the drawn line specification unit 7 specifies the threshold m as the information on the line for the graph creation unit 8 to be drawn on the graph. The graph creation unit 8 draws the line indicating the threshold m on the graph of the composite data K to display on the graph display unit 9. In this manner, as shown in FIG. 5(*d*), the line indicating the threshold m is displayed on the graph of the composite data K. Here, as shown in FIG. 6, the fact that the step (S8) for drawing the line indicating the threshold m on the graph of the composite data K has been performed is stored in the analysis log storage 2.

Next, in S9, the region extraction unit 10 extracts a region where the line forming the graph is above the line indicating the threshold m and a region where the graph-forming line is below the threshold-indicating line. Then, the region extraction unit 10 sends the positional information of the extracted region in the graph to the graph creation unit 8. The graph creation unit 8 commands the graph display unit 9, on the basis of the positional information received from the region extraction unit 10, to display the operation icon for each of the extracted regions. In this manner, as shown in FIG. 5(*d*), the operation icons i1 and i2 are displayed in the graph of the composite data K.

Next, in S10, the operator determines whether each region extracted by the region extraction unit 10 relates to the cause of abnormality occurrence in the air-conditioning equipment. Here, because the operator has knowledge that "the composite data K larger than m is likely to be a cause of abnormality", the operator finds a region R in FIG. 5(*d*) where the composite data K is larger than the threshold m. Then, the process proceeds to S11.

In S11, the operator specifies the region R as the cause of abnormality of the air-conditioning equipment by operating the operation icon i1 displayed on the region R considered to be the cause of abnormality of the air-conditioning equipment. Receiving the input from the operator to the operation icon i1, the region specification unit 11 specifies the region R to the graph creation unit 8. The graph creation unit 8 sends a command to the graph display unit 9 to display the information that the region R has been specified. Here, as shown in FIG. 6, the fact that the step (S11) for specifying the region considered to be the cause of abnormality of the air-conditioning equipment has been performed, is stored in the analysis log storage 2.

Next, in S12, the graph creation unit 8 sends the information that the region R has been specified by the region specification unit 11, to the output step extraction unit 12. Receiving the information that the region R has been specified, the output end point specification unit 13 of the output step extraction unit 12 specifies the step (S11) in which the region R has been specified by the region specification unit 11, as the output end point from among the steps stored in the analysis log storage 2. Further, the output end point specification unit 13 extracts the step (S11) specified as the output end point from among the steps stored in the analysis log storage 2, and stores the extracted step in the output step storage 15 as an output candidate step.

Next, in S13, the output start point determination unit 14 of the output step extraction unit 12 determines whether the graph including the region R specified by the region specification unit 11, namely the graph of the composite data K, is a graph of composite data or a graph of operation data. Here, because the composite data K is composite data, the process proceeds to S14.

Next, in S14, the output start point determination unit 14 traces back, in reverse time order, the steps stored in the analysis log storage 2 from the output end point. Upon reaching the step (S4) in which the composite data K is generated, the tracing-back operation is stopped. In S15, the output start point determination unit 14 extracts, from among the steps stored in the analysis log storage 2, the step (S4) in which the composite data K has been generated and which has been reached in S14, and stores the extracted step in the output step storage 15 as an output candidate step.

Next, in S16, the output start point determination unit 14 obtains the information of the arithmetic expression used in the step (S4) which has been stored in the output step storage 15 and in which the composite data K has been generated, and determines whether the composite data K can be expressed only by operation data. Here, according to the information of the arithmetic expression, the composite data K can be expressed as "K=B−C" using the operation data B and the operation data C. Therefore, the process proceeds to S17.

Next, in S17, the output start point determination unit 14 specifies, as the output start point, the last stored step among the steps stored at this point in the output step storage 15, and stops further tracing back the steps stored in the analysis log storage 2. Here, in the output step storage 15, the step (S4) in which the composite data K is generated and the step (S11) in which the region R is specified by the region specification unit 11 are stored. The last stored step between these two steps is the step (S4) in which the composite data K is generated. Therefore, the output start point determination unit 14 specifies the step (S4) in which the composite data K is generated, as the output start point.

Next, in S18, the data conversion unit 16 reads out the data of the steps stored in the output step storage 15, namely of the step (S4) in which the composite data K is generated and of the step (S11) in which the region R is specified by the region specification unit 11.

In S19, the data conversion unit 16 converts the data read out from the output step storage 15 into text-format data, to output it. Here, the text data shown in FIG. 7 is outputted from the data conversion unit 16.

Figure 8:
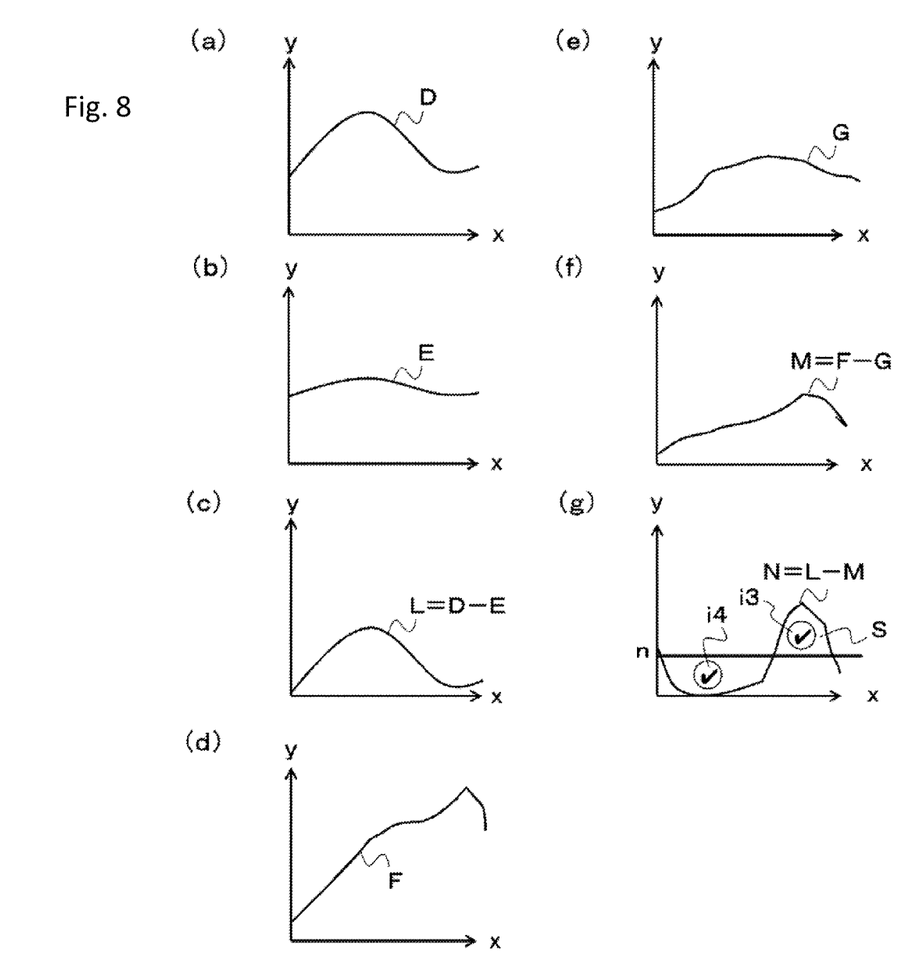
FIG. 8 are drawings which show an analysis procedure taken by the operator in an operation example 2 of the procedure extraction system according to Embodiment 1 of the present invention.
Figure 9:
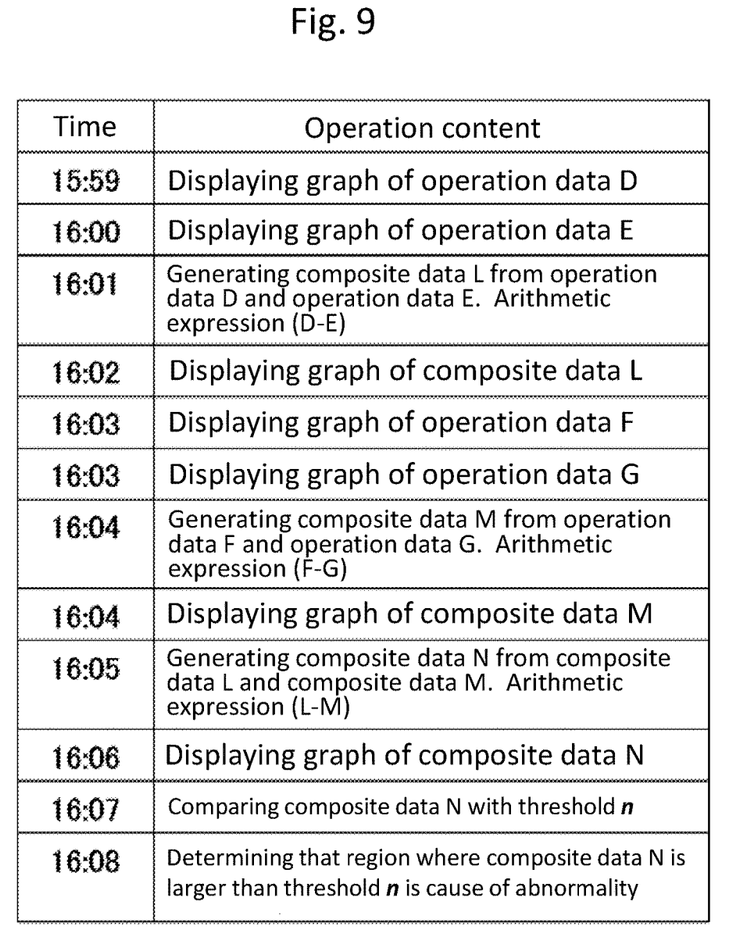
FIG. 9 shows an example of the analysis procedures taken by the operator and stored in the analysis log storage in the operation example 2.
Figure 10:
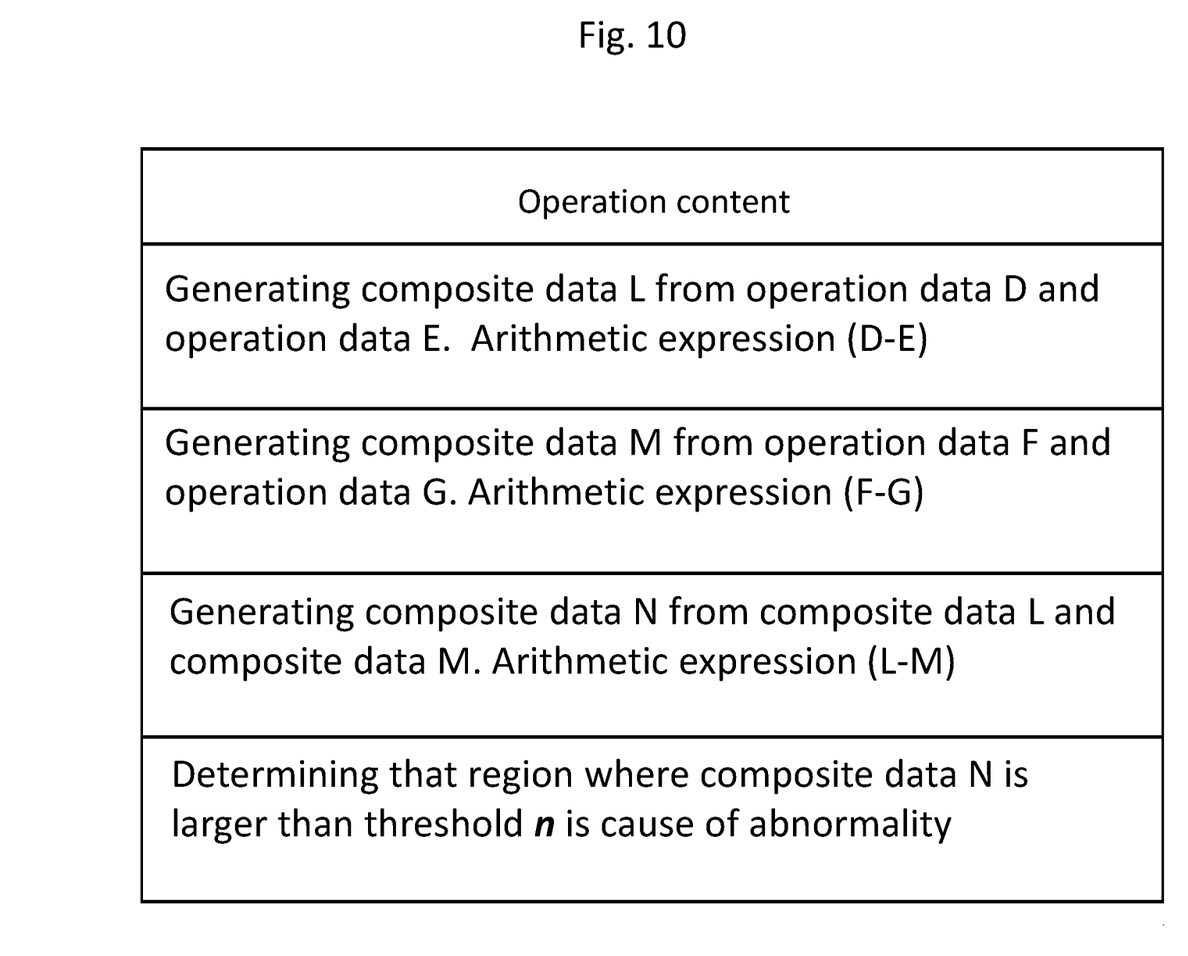
FIG. 10 shows an example of texts outputted from the data conversion unit in the operation example 2.

Next, an operation example 2 will be explained. FIG. 8 shows an analysis procedure which has been performed by an operator in the operation example 2 of the procedure extraction system according to Embodiment 1 of the present invention. Note here that, FIGS. 8 (*a*) through (*g*) are arranged in time order. FIG. 9 is an example of the analysis procedure which has been performed by the operator in the operation example 2 and stored in the analysis log storage 2. FIG. 10 shows an example of the text outputted from the data conversion unit 16 in the operation example 2.

First, the necessary steps from the steps S1 through S7 are performed, so that the graph of operation data D is created; the graph of operation data E is created; composite data L is generated by subtracting the operation data E from the operation data D; the graph of the composite data L is created; the graph of operation data F is created; the graph of operation data G is created; composite data M is generated by subtracting the operation data G from the operation data F; the graph of the composite data M is created; composite data N is generated by subtracting the composite data M from the composite data L; and the graph of the composite data N is created. By these operations, the graphs of FIGS. 8(*a*) through (*f*) are sequentially displayed, and then, the graph FIG. 8(*g*) of the composite data N is displayed. As the detailed operation is similar to the operation example 1, the explanation will be omitted.

Next, in S7, the operator determines to draw the line indicating a threshold n on the graph of the composite data N created in S6, and the process proceeds to S8. Next, similarly to the operation example 1, S8 and S9 are performed. By these operations, operation icons i3 and i4 are displayed in the graph of the composite data N, as shown in FIG. 8(*g*).

Next, in S10, the operator determines whether each region extracted by the region extraction unit 10 relates to the cause of abnormality occurrence in the air-conditioning equipment. Here, because the operator has knowledge that "the composite data N larger than n is likely to be a cause of abnormality", the operator finds a region S where the composite data N is larger than the threshold n in FIG. 8(*g*), and the process proceeds to S11.

In S11, the operator specifies the region S as the cause of abnormality of the air-conditioning equipment by operating the operation icon i3 displayed in the region S considered to be the cause of abnormality of the air-conditioning equipment. Receiving the input from the operator to the operation icon i3, the region specification unit 11 specifies the region S to the graph creation unit 8. The graph creation unit 8 sends a command to the graph display unit 9 to display the fact that the region S has been specified. Here, as shown in FIG. 9, the fact that the step (S11) for specifying the region considered to be the cause of abnormality of the air-conditioning equipment has been performed, is stored in the analysis log storage 2.

Next, in S12, the graph creation unit 8 sends the information that the region S has been specified by the region specification unit 11, to the output step extraction unit 12. Receiving information that the region S has been specified, the output end point specification unit 13 of the output step extraction unit 12 specifies the step (S11) in which the region S has been specified by the region specification unit 11, as the output end point from among the steps stored in the analysis log storage 2. Further, the output end point specification unit 13 extracts the step (S11) specified as the output end point from among the steps stored in the analysis log storage 2, and stores the extracted step in the output step storage 15 as an output candidate step.

Next, in S13, the output start point determination unit 14 of the output step extraction unit 12 determines whether the graph including the region S specified by the region specification unit 11, namely the graph of the composite data N, is a graph of composite data or a graph of operation data. As the composite data N is composite data here, the process proceeds to S14. In S15, the output start point determination unit 14 extracts, from among the steps stored in the analysis log storage 2, the step (S4) in which the composite data N has been generated and which has been reached in S14, and stores the extracted step in the output step storage 15 as an output candidate step.

Next, in S16, the output start point determination unit 14 obtains the information of the arithmetic expression used in the step (S4) which has been stored in the output step storage 15 and in which the composite data N has been generated, and determines whether the composite data N can be expressed only by operation data. Here, according to the information included in the arithmetic expression, the composite data N can be expressed as "N=L−M" by using the composite data L and the composite data M. At this point, however, neither the composite data L nor the composite data M can be expressed by operation data despite referencing the information of the arithmetic expression included in the steps stored so far in the output step storage 15.

Therefore, the process returns to S14 to restart tracing back the steps stored in the analysis log storage 2. Then, the tracing-back operation reaches the step in which the composite data M is generated by performing "F−G" calculation, to proceed to S16 via S15. Even at this point, the composite data N cannot be expressed only by operation data, but merely can be expressed as "N=L−M=L−(F−G)". Therefore, the process returns to S14.

After restarting again to trace back the steps stored in the analysis log storage 2, the process reaches the step in which the composite data L is generated by performing "D−E" calculation. Then, the process proceeds to S16 via S15. At this point, with reference to the steps extracted and stored in the output step storage 15, it becomes clear that the composite data N can be expressed as "N=L−M=(D−E)−(F−G)". In other words, the composite data N can come to be expressed only by operation data. Therefore, the process proceeds to S17.

Next, in S17, the output start point determination unit 14 specifies, as the output start point, the last stored step among the steps stored at this point in the output step storage 15, and stops further tracing back the steps stored in the analysis log storage 2. Here, stored in the output step storage 15 are the step (S4) in which the composite data L is generated; the step (S4) in which the composite data M is generated; the step (S4) in which the composite data N is generated, and the step (S11) in which the region S is specified by the region specification unit 11. Among these steps, the last stored step is the step (S4) in which the composite data L is generated. Therefore, the output start point determination unit 14 specifies, as the output start point, the step (S4) in which the composite data L is generated.

Next, in S18, the data conversion unit 16 reads out the data of the steps stored in the output step storage 15, namely, of the step (S4) in which the composite data L is generated, and of the step (S11) in which the region S is specified by the region specification unit 11.

In S19, the data conversion unit 16 converts the data read out from the output step storage 15 into text-format data, to output it. Here, text data shown in FIG. 10 is outputted from the data conversion unit 16.

As described so far, in Embodiment 1, as provided with an analysis log storage 2 to store a procedure in accordance with which an operator has analyzed an operating condition of air-conditioning equipment using operation data relating to the operating condition of the facility equipment, a graph creation unit 8 to create a graph using the operation data, a region specification unit 11 to specify at least a region of the graph, and an output step extraction unit 12 to extract, from among steps included in the procedure stored in the analysis log storage 2, a step necessary for creating the graph including the region specified by the region specification unit 11, the procedure extraction system can extract a step having contributed to the specification of the cause of abnormality of the air-conditioning equipment from among the procedure conducted by the operator. Therefore, the workload of operators can be reduced.

Utilization of the information of the steps extracted by the output step extraction unit 12 can reduce the operators' workload to write their work reports. For this purpose, it is preferable to output the information of the steps extracted by the output step extraction unit 12 in a text format.

Also, as the output step extraction unit 12 is provided with an output start point determination 14 to determine, when the graph including the region specified by the region specification unit 11 is a graph of composite data, that a step including information on an arithmetic expression used for generating the composite data is a step for creating the graph including the region specified by the region specification unit 11, the procedure extraction system can readily and rightly extract a step having contributed to the specification of the cause of abnormality of the air-conditioning equipment.

Furthermore, utilization of the information on which region is specified by the region specification unit 11 helps the operators find out which portion of the graph relates to determining the cause of abnormalities, reducing their workload to write their work reports.

The output start point determination unit 14 traces back, in reverse time order, steps stored in the analysis log storage 2 starting from the step in which the region is specified by the region specification unit 11, obtains information on an arithmetic expression used for producing the composite data from the steps stored in the analysis log storage 2, and keeps tracing back, on the basis of the obtained information on the arithmetic expression, the steps stored in the analysis log storage 2 until the composite data is expressed only by operation between the operation data. As the result, the procedure extraction system can readily and rightly extract a step having contributed to the specification of the cause of abnormality of the air-conditioning equipment.

The procedure extraction system is provided with a drawn line specification unit 7 to specify a mathematical formula expressing a line indicating a threshold to be drawn on the graph, and a region extraction unit 10 to extract a region where a line of the graph is above the line drawn on the graph and a region where the graph line is below the drawn line, wherein the region specification unit 11 specifies at least one region from among the regions extracted by the region extraction unit 10. As the result, the procedure extraction system can improve its operability for an operator.

DESCRIPTION OF SYMBOLS 1 operation data storage
2 analysis log storage
3 composite data storage
4 data specification unit
5 arithmetic expression specification unit
6 data calculation unit
7 drawn line specification unit
8 graph creation unit
9 graph display unit
10 region extraction unit
11 region specification unit
12 output step extraction unit
13 output end point specification unit
14 output start point determination unit
15 output step storage
16 data conversion unit
21 input device
22 output device
23 memory
24 processor
25 program

The invention claimed is:

1. A procedure extraction system for extracting and storing, from a plurality of steps included in an analysis log, those steps relevant to determination of a cause of an abnormality in facility equipment, comprising:
  an analysis log storage to store a procedure in accordance with which an operator has analyzed an operating condition of facility equipment using operation data relating to the operating condition of the facility equipment;
  a processor to execute a program; and
  a memory to store the program which, when executed by the processor, performs processes of:
    creating a graph using the operation data,
    specifying, upon receiving an input from the operator, at least a region of the graph as a region considered to be a cause of abnormality of the facility equipment, and
    extracting, from among steps included in the procedure stored in the analysis log storage, a step necessary for creating the graph including the region specified by the process of specifying, said extracting including
      determining, when the graph is a graph of composite data, that a step including information on an arithmetic expression used for generating the composite data is relevant to the determination of the cause of the abnormality,
      tracing back, in reverse time order, steps stored in the analysis log storage starting from the step in which the region is specified, to obtain information on arithmetic expressions used for generating the composite data of the graph until the composite data is expressed only by operations between operation data, and
      identifying each of the steps traversed in the tracing back as relevant to the determination of the cause of the abnormality.

2. The procedure extraction system according to claim 1, wherein the program further performs processes of:
  specifying a mathematical formula expressing a line to be drawn on the graph; and
  extracting a region where a line of the graph is above the line drawn on the graph and a region where the graph line is below the drawn line, and wherein
  the process of specifying a region is a process of specifying at least one region from among the regions extracted by the process of extracting a region.

* * * * *